March 11, 1958 — K. R. WEBER — 2,826,344
FERTILIZER DISTRIBUTOR
Filed July 5, 1955
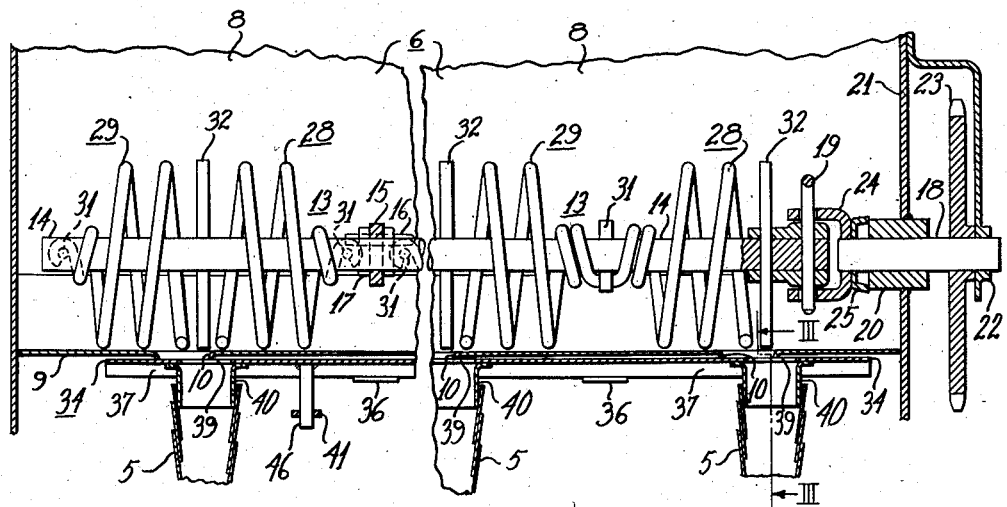
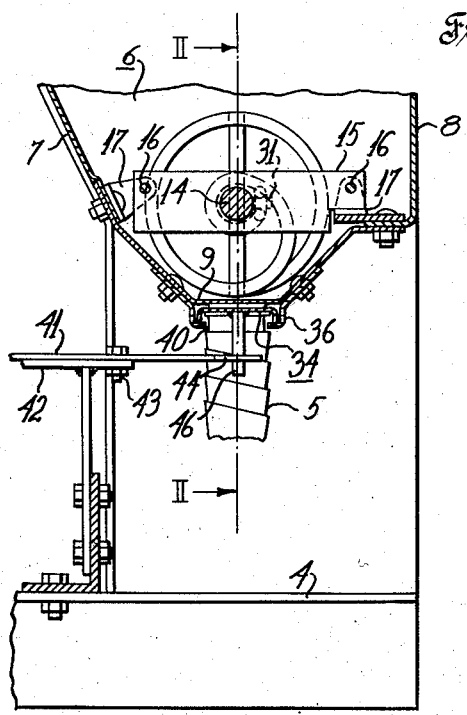
Fig. 1
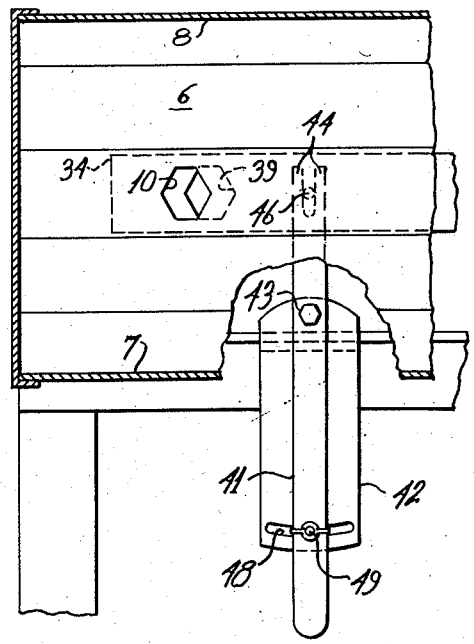
Fig. 4
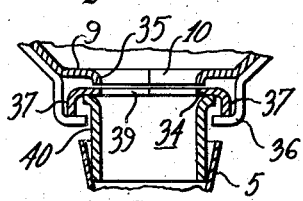
Fig. 3
Inventor
Kenneth R. Weber ns of the United States Patent Office 2,826,344
Patented Mar. 11, 1958

2,826,344

FERTILIZER DISTRIBUTOR

Kenneth R. Weber, La Crosse, Wis., assignor to Allis-Chalmers Manufacturing Company, Milwaukee, Wis.

Application July 5, 1955, Serial No. 519,951

5 Claims. (Cl. 222—485)

This invention relates to an agricultural implement for distributing lime, chemical fertilizer and like pulverized materials.

Fertilizer distributors have openings in the bottom of the fertilizer hopper through which the fertilizer flows for distribution. The size of the openings to the passage of fertilizer is regulated to control the flow rate of the fertilizer. Valves or gates employed for regulating the size of hopper openings have been so constructed that fertilizer accumulates and cakes between relatively movable parts causing jamming of the valve so that it cannot readily be moved into another position.

After each day's use the fertilizer hopper and valve should be thoroughly cleaned to avoid caking of the fertilizer which may cause jamming of movable parts and to avoid corrosion of hopper and valve.

The construction, however, of valves in fertilizer hoppers has been such as to permit leakage of fertilizer at places where fertilizer could accumulate and cause jamming of the valve. The construction further has been such that easy access is not provided to places where fertilizer cakes and causes jamming, and such places therefore are not always likely to be cleaned.

It is an object of the present invention to provide a fertilizer distributor with an improved valve or gate constructed and arranged to overcome the above difficulties.

Another object of the invention is to construct a valve that regulates the size of hopper openings and confines fertilizer to the valve fertilizer passageways to prevent leakage of fertilizer between relatively movable valve parts.

Another object of the invention is to provide a simple valve arrangement for a fertilizer distributor that has relatively little frictional contact between relatively movable valve parts.

Another object of the invention is to provide a fertilizer distributor having fertilizer conveying tubes that are laterally movable into and out of alignment with openings in the bottom of the hopper.

Another object of the invention is to provide a fertilizer distributor having a control valve that is a simple, compact and durable structure that is inexpensive to manufacture, assemble and service.

Other objects and advantages will be apparent upon a reading of the following description with the accompanying drawings, in which:

Fig. 1 is a transverse sectional view, with portions broken away, of a fertilizer distributor embodying the present invention;

Fig. 2 is a sectional view taken along the lines II—II of Fig. 1;

Fig. 3 is an enlargement of a sectional view of the fertilizer distributor taken along lines III—III of Fig. 2; and Fig. 4 is a plan view of a portion of the fertilizer distributor shown in Fig. 1 with portions removed and broken away.

The drawings show a fertilizer distributor comprising a hopper 6 for receiving fertilizer material to be distributed broadcast fashion or through a conveying tube 5 and a boot, not shown, along with grain being seeded and supplied from an adjacent hopper, not shown. Hopper 6 may be suitably supported by known means such as ground support wheels, but is preferably supported on a frame 4 as a fully mounted tractor implement and may be part of a tractor mounted grain drill, not shown.

Hopper 6 has longitudinally extending sides 7 and 8 converging toward a perforated, stationary wall member or bottom 9 of the hopper. Bottom 9 is bolted to sides 7 and 8 so as to present upwardly and downwardly facing sides and is provided with a series of openings 10 spaced longitudinally of the bottom for the passage of fertilizer therethrough.

An agitator or auger 13 is disposed longitudinally along the hopper bottom for loosening fertilizer and moving it to the openings 10 in the hopper bottom. Auger 13 comprises a removable assembly including a spindle or shaft 14 passing through spaced bearing straps 15. Bearing straps 15 extend across the hopper bottom and are secured by removable pins 16 to ears 17 rigid with sides 7 and 8 of the hopper for supporting the bearing straps.

A coupling end of shaft 14, Fig. 2, is positioned in a U-shaped coupling 24 attached to an end of a stub shaft 18 to couple shafts 14 and 18. An easily removable coupling pin 19 extends transversely through the coupled ends of shafts 14 and 18 to secure them in coupled relationship. A sleeve 20 extends through end wall 21 of hopper 6 and is welded to the wall 21. Stub shaft 18 extends through sleeve 20 with an annular cap 25 on shaft 18 overlying the end of sleeve 20 to seal the sleeve to passage of dust therethrough. The outer end of shaft 18 is supported in a bushing in a bearing bracket 22 which is attached to wall 21. A sprocket wheel 23 is suitably mounted on shaft 18 between wall 21 and bearing bracket 22 for rotation therewith. Sprocket wheel 23 receives a chain, not shown, driven by suitable means such as the drive wheel of a tractor, not shown.

To agitate and force fertilizer toward hopper openings 10, the auger 13 comprises a series of spaced spring steel helices 28, 29 mounted on shaft 14 for rotation therewith. Adjacent helices are left hand and right hand helices that force fertilizer in opposite directions along the bottom of the hopper. Each helix is suitably secured at one end to shaft 14 by a pin 31 disposed radially in shaft 14. Pins 32 extend through shaft 14 to the bottom of the hopper and in alignment with openings 10 to keep the openings clear of clumps that could lodge there.

Gate means for controlling discharge of distributable material from the hopper 6 comprise the mentioned perforated wall member 9, a perforated elongated slide member or valve plate 34, and guide means operatively mounting the slide member 34 on the hopper in face to face relation to and at a predetermined or constant downward spacing from said downwardly facing side of the wall member 9 for reciprocating movement lengthwise of the latter. Openings 10 in hopper bottom 9 have peripheries formed by flanges 35 which individually surround the openings 10, respectively, and extend downward below the hopper bottom 9.

Valve plate 34 is channel shaped with side edges 37 turned downward to serve as relatively narrow runners slidable on a series of relatively spaced abutments or guides 36. Guides 36 are relatively narrow laterally disposed strips adjustably and detachably secured to the hopper bottom 9 along opposite inclined portions thereof and are longitudinally spaced intermediate hopper openings 10. Guide strips 36 are arranged and shaped so as to contact downwardly facing surfaces of the slide member 34 along longitudinally extending and transversely spaced side portions of the latter; to slidably guide and support it longitudinally, to secure it against lateral displacement and to present one face of plate 34 in contactable relation to the downward turned edges of the flanges 35 of openings 10. The flanges of openings 10 serve to space plate 34 from the bottom surface of the hopper.

Valve plate 34 is provided with a plurality of openings or passageways 39 therethrough which are spaced to correspond to the spacing of the openings 10 in hopper bottom 9. Downspouts 40, secured to valve plate 34 as by welding, extend passages 39 downward. With the valve plate positioned as in Fig. 4, openings 10 and 39 are in partial alignment and provide a straight drop for fertilizer from the hopper through downspouts 40 for broadcast distribution. Flexible ribbon type conveying tubes 5 may be attached to downspouts 40 when the fertilizer distributor is used in a known manner such as attached to a grain drill for both seeding and fertilizing.

Means are provided, Fig. 4, for moving valve plate 34 longitudinally of hopper bottom 9 to vary the registration of hopper bottom openings 10 with valve plate passages 39. Such means are shown as comprising a fertilizer control lever 41 horizontally swingable to left or right about a vertical pivot provided by a bolt or rivet 43 securing the lever to a base plate 42 supported from the implement frame 4. An end 44 of lever 41 is fork shaped and extends under valve plate 34. A projection 46 on valve plate 34 extends downward between the fingers of the forked end 44 so that it is engaged thereby for moving valve plate 34.

The hand operated end of control lever 41 may be secured on base plate 42 for locking the slide member 34 selectively in various positions of lengthwise adjustment, including limit positions in which the wall apertures 10 and slide apertures 39 register and nonregister, respectively, with each other, and intermediate positions in which the wall apertures 10 are partly open. Base plate 42 has an arcuate slot 48 receiving a bolt 49 passing through control lever 41, and a wing nut on bolt 49 when tightened secures the lever in a selected position. The bolt 49 and wing nut may be removed and the valve plate swung back and forth beyond the arcuate slot to aid in cleaning the valve mechanism of fertilizer.

The arrangement described of mounting the valve plate so that it is spaced from the hopper bottom by the downward extending edges of the hopper openings makes a good seal to prevent leakage of fertilizer and provides a minimum of sliding friction between the hopper bottom and valve plate 34. Similarly the downward turned edges of the channel shaped valve plate and the spaced relatively narrow support strips provide a minimum of sliding friction therebetween. The arrangement further provides easily accessible open space between the valve plate and the hopper bottom so that fertilizer that does get on the plate will work out and not build up and cake to possibly jam the valve plate. The support brackets or strips 36 are relatively narrow and are located away from the hopper openings and provide such very little space behind the strip that fertilizer is not likely to accumulate there. The arrangement, moreover, provides easy access to the space back of bracket strips 36.

Although but one embodiment of the present invention has been shown and described, changes and modifications may be made therein without departing from the spirit of the invention or the scope of the appended claims.

What is claimed and desired to secure by Letters Patent is:

1. A distributor comprising a longitudinally extending hopper for receiving material, said hopper having a bottom having a plurality of longitudinally spaced openings defined by flanges extending downward from said bottom at each of said openings, a plate disposed longitudinally of and below said hopper bottom, strips detachably secured to said hopper intermediate said openings to underlie said plate to slidably support said plate in upwardly contactable relation with said flanges of said hopper openings and at a constant downward spacing from said hopper bottom, said flanges spacing said plate from said hopper bottom so that only said flanges and strips frictionally engage said plate, said plate having a plurality of longitudinally spaced passages corresponding to said openings in said hopper bottom, each of said passages including a downspout fixed with said plate, and means for moving said plate longitudinally of said hopper bottom to vary the registration of said hopper bottom openings with said passages in said plate between positions in which said hopper bottom openings are fully closed and fully open.

2. A distributor comprising a longitudinally extending hopper for receiving material, said hopper having a bottom having a plurality of longitudinally spaced openings defined by flanges extending downward from said bottom at each of said openings, a channel shaped plate disposed longitudinally of said hopper bottom with the side edges of said channel shaped plate extending downward, strips detachably secured to said hopper intermediate said openings to underlie the downward turned edges of said channel shaped plate to slidably support said channel shaped plate and hold a face thereof in abutting contact with said flanges of said hopper openings, said flanges spacing said channel shaped plate from said hopper bottom so that only said flanges and strips frictionally engage said channel shaped plate, said channel shaped plate having a plurality of longitudinally spaced passages corresponding to said openings in said hopper bottom, each said passage including a downspout integral with said channel shaped plate, a flexible tube detachably secured to each said downspout for guiding the flow of material from said hopper, and means moving said channel shaped plate longitudinally of said hopper bottom to vary the registration of said hopper bottom openings with said passages in said channel shaped plate between positions in which said hopper bottom openings are fully closed and fully open.

3. A distributor comprising a hopper for receiving distributable material, and gate means for controlling discharge of said material from said hopper, said gate means comprising a perforated stationary wall member of said hopper having upwardly and downwardly facing sides; a perforated elongated slide member; and guide means operatively mounting said slide member on said hopper in face to face relation to and at a predetermined downward spacing from said downwardly facing side of said wall member for reciprocating movement lengthwise of the latter; said wall member and said slide member each having a series of relatively spaced apertures adapted to register and nonregister with each other upon said endwise movement of said slide member to predetermined limit positions, respectively; and said guide means including a series of flanges individually surrounding said apertures of and secured to one of said members in contactable relation to the other of said members, and a series of relatively spaced abutments contacting downwardly facing surfaces of said slide member along longitudinally extending and transversely spaced side portions of the latter, so as to guide said slide member in parallel relation to and at a constant downward spacing from said wall member.

4. A distributor as set forth in claim 3, wherein said flanges are secured to said wall member of said hopper.

5. A distributor as set forth in claim 3, wherein said slide member is channel shaped and arranged so that the longitudinally extending free edges of its flanges bear downwardly upon said abutments.

References Cited in the file of this patent

UNITED STATES PATENTS

| | | |
|---|---|---|
| 1,418,169 | Printz | May 30, 1922 |
| 1,485,032 | Jones | Feb. 26, 1924 |
| 1,713,043 | Fullerton | May 14, 1929 |
| 1,840,602 | Pender | Jan. 12, 1932 |
| 1,921,062 | Adams | Aug. 8, 1933 |
| 2,035,058 | Feltman | Mar. 24, 1936 |
| 2,050,787 | Forsberg | Aug. 11, 1936 |
| 2,704,624 | Seltzer | Mar. 22, 1955 |